(Model.)
W. M. SLOANE.
FLUID PRESSURE REGULATING VALVE.
No. 246,348. Patented Aug. 30, 1881.
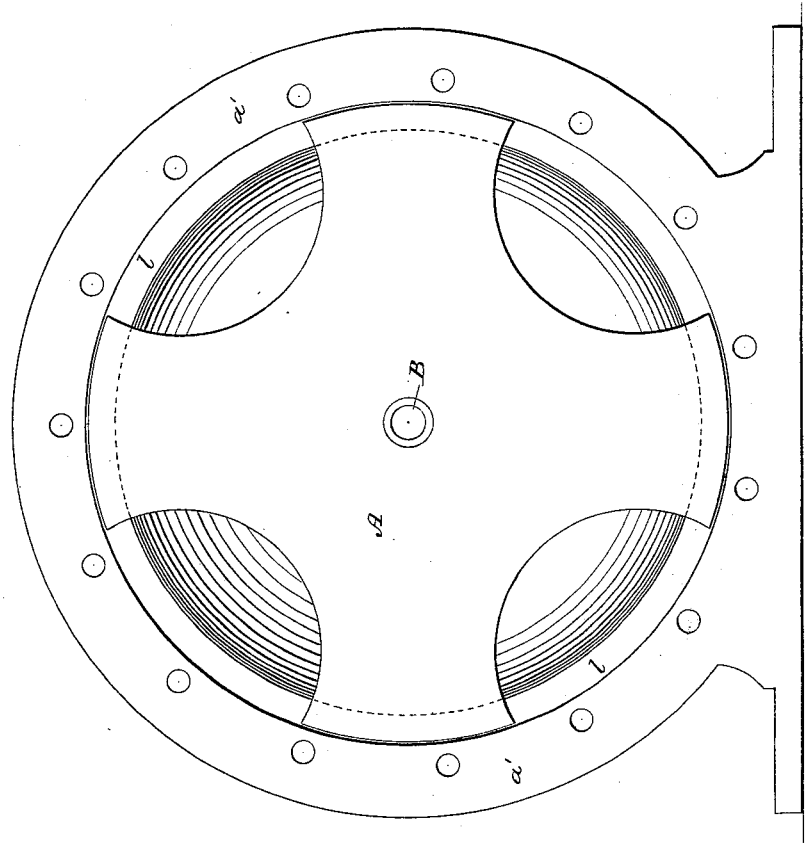
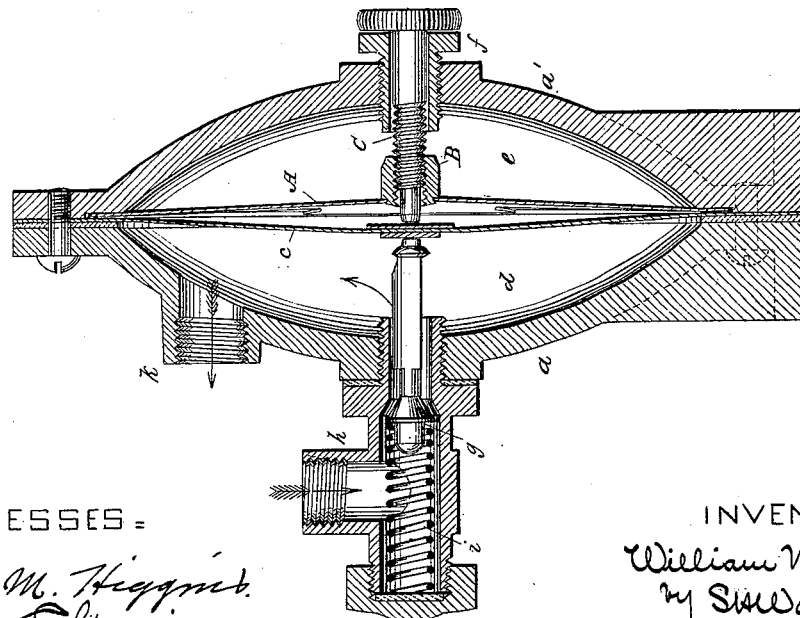
WITNESSES:
Chas. M. Higgins
Jno. E. Gavin
INVENTOR:
William M. Sloane
by S. W. Wales
Attys.

UNITED STATES PATENT OFFICE.

WILLIAM M. SLOANE, OF BROOKLYN, NEW YORK.

FLUID-PRESSURE-REGULATING VALVE.

SPECIFICATION forming part of Letters Patent No. 246,348, dated August 30, 1881.

Application filed January 14, 1881. (Model.)

*To all whom it may concern:*

Be it known that I, WILLIAM M. SLOANE, of Brooklyn, Kings county, New York, have invented certain new and useful Improvements in Pressure-Regulating Valves, of which the following is a specification.

My invention relates to that class of valves for regulating the pressure of gas, steam, air, or other fluid, or, rather, for delivering such fluid under a uniform and reduced pressure from a reservoir thereof under high pressure, which usually consist of a valve opening against the high pressure and a diaphragm tending to keep this valve open, while the pressure admitted through the valve on one side of the diaphragm tends to keep the valve closed, which actions and reactions cause the gas to be delivered uniformly under the desired pressure, according to the adjustment of the diaphragm. My invention aims to provide a more simple and compact valve of this kind, and one which may be easily and sensitively adjusted; and my improvements relate, mainly, to the construction and arrangement of the spring which actuates the diaphragm and the high-pressure valve in opposition to the pressure, and also in the arrangement of the adjusting-screw thereof, as hereinafter fully set forth.

Figure 1 of the drawings annexed presents a vertical section of my improved valve; and Fig. 2, an elevation of one-half thereof, showing the diaphragm-spring.

The casing of the valve consists, as usual, of two concave shells, *a a*, fastened together by marginal screws, while the diaphragm *c* is held between these shells, as shown. This diaphragm may be made of any suitable material having sufficient strength and flexibility; but thin sheet-brass is preferably used, and the diaphragm divides the casing, as usual, into two chambers, *d e*. The chamber *e* communicates freely with the atmosphere through the neck *f*, while the gas or other fluid is admitted to and delivered from the chamber *d*. The high-pressure gas from its reservoir or other source enters the chamber *d* through the inlet *h*, the opening of which into the chamber *d* is controlled by the high-pressure valve *g*, which opens against the pressure, as shown. The stem of this valve rests on the diaphragm, and the diaphragm is constantly pressed by a spring, A, in a direction to open the valve, while a spring, *i*, constantly tends to close the valve. The diaphragm - spring, however, normally overcomes the valve-spring *i* and keeps the valve open, thus admitting the gas from the high-pressure reservoir to the chamber *d* upon one side of the diaphragm, from which it is delivered through the outlet *k* to the desired point. The gas-pressure thus admitted on the diaphragm will, when it reaches a certain point, overcome the opposing spring-pressure, and in thus depressing the diaphragm will permit the valve *g* to close, thus momentarily stopping the flow; but as soon as the gas-pressure on the diaphragm falls below the spring-pressure the diaphragm will be again moved in the opposite direction, so as to again open the valve and continue the flow, thus maintaining a steady delivery of gas through the outlet *k* under a uniform reduced pressure, which may be increased or decreased, as desired, by adjusting the spring-pressure on the diaphragm, as will be readily understood by those familiar with valves of this kind.

Now, according to my invention, I provide the diaphragm with an improved and novel form of spring. (Shown at A in Figs. 1 and 2.) This spring is preferably made of sheet brass or steel, and in the form of a flat or slightly-convexed plate, placed parallel with the diaphragm, and preferably supported at its margin or extremities in a groove or shoulder, *l*, on one of the shells *a*. This spring may be of continuous circular form, but, preferably, has portions cut away at intervals around its periphery to provide a number of rays to give the plate more elasticity, as will be readily understood. In the drawings I have shown the plate with four rays, or in the form of a Maltese cross, which is the form I prefer; but this, of course, may be varied when desired, and the spring may be even of oblong rectangular form, if preferred. At the center of this plate-spring is fixed a nut, B, in which the adjusting-screw C turns. This screw passes freely through the neck *f*, its milled head resting thereon, while its point which projects through the nut bears upon the center of the diaphragm in line with the stem of the high-pressure valve.

It will now be observed that when the screw is turned or screwed inward the spring-plate will be bowed or flexed in one direction and the diaphragm in the other, thus tending to open the high-pressure valve $g$ wider and putting a greater opposing pressure on the diaphragm, which, of course, may be adjusted to any desired degree, more or less, by turning the screw more or less back or forth. This form of spring, as may now be observed, has the advantage of being inexpensive, of lying close to the diaphragm, and of being very compact; and it, furthermore, possesses great strength with a small amount of metal, and occupies but a very small space, while the arrangement of the adjusting-screw in working through the spring conduces further to compactness, cheapness, and simplicity, and enables fine degrees of adjustment to be easily and quickly effected, thus forming a material improvement in valves of this kind.

What I claim as my invention is—

1. In a regulating-valve of substantially the described kind, a plate-spring arranged parallel with the diaphragm fixed at its extremities and provided with a nut at or near the center of the diaphragm, with an adjusting-screw working through the same and bearing upon the diaphragm, substantially as and for the purpose herein shown and described.

2. In a regulating-valve of substantially the described kind, a plate-spring of circular or similar form, with marginal notches and intervening rays or arms, and arranged parallel with the diaphragm fixed at its extremities, and provided with a means of bowing the same at the center and adjusting the pressure thereof upon the diaphragm, substantially as herein set forth.

3. The combination, in a valve of the described kind, of the high-pressure valve $g$, diaphragm $c$, spring A, nut B, and screw C, substantially as herein shown and described.

WM. M. SLOANE.

Witnesses:
JOSEPH B. SOHM,
EMMET R. OLCOTT.